Oct. 18, 1966     D. C. SPAULDING, JR     3,279,216
MISALIGNMENT COUPLING
Filed Jan. 6, 1965
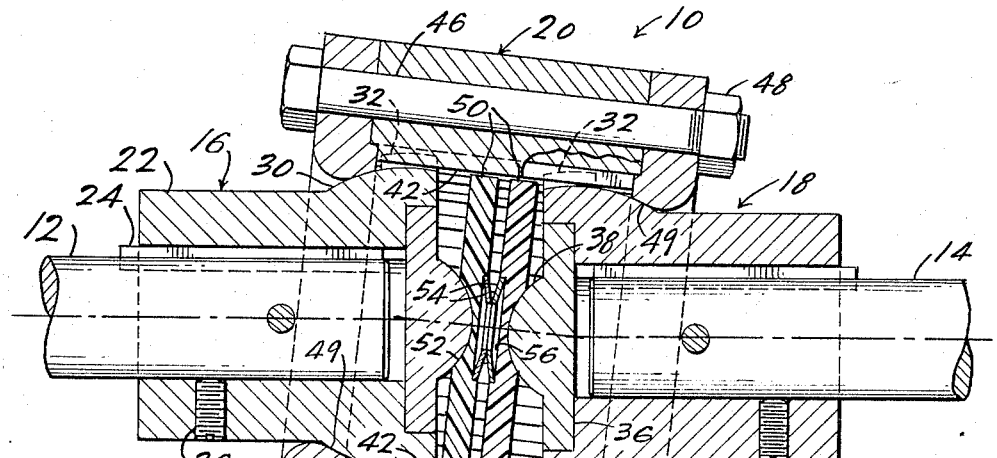
FIG-1-
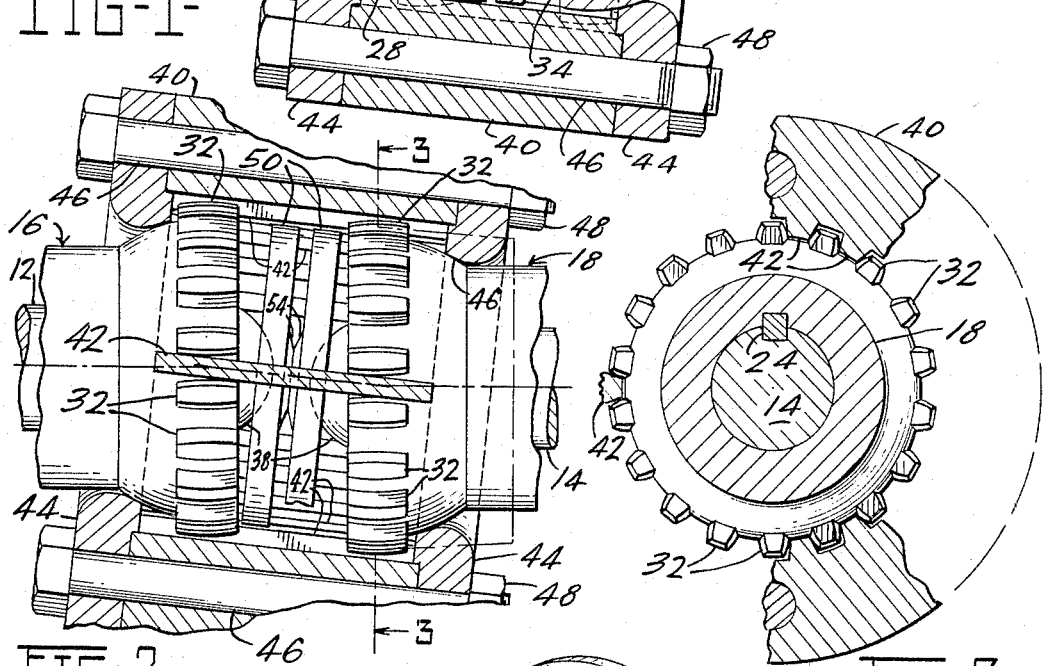
FIG-2-
FIG-3-
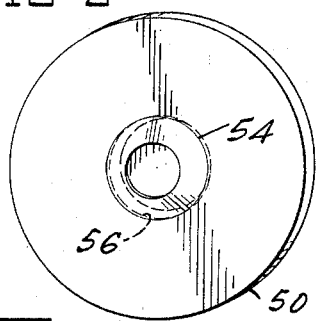
FIG-4-
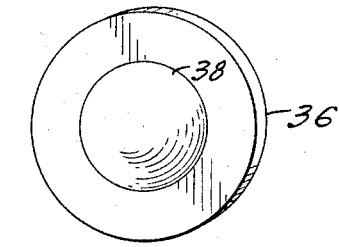
FIG-5-
INVENTOR:
DAVID C. SPAULDING.
BY
ATT'YS.

United States Patent Office 3,279,216
Patented Oct. 18, 1966

3,279,216
MISALIGNMENT COUPLING
David C. Spaulding, Jr., Toledo, Ohio, assignor to The Bunting Brass and Bronze Company, Toledo, Ohio, a corporation of Ohio
Filed Jan. 6, 1965, Ser. No. 423,711
8 Claims. (Cl. 64—9)

This invention relates to a coupling to be interposed between a drive shaft and a driven shaft for the purpose of compensating for angular misalignment between the shafts as well as for parallel or offset misalignment between them. The coupling is an improvement on the device covered by my Patent No. 3,142,972.

Misalignment couplings of various designs have been known heretofore in the art. Such couplings, particularly those compensating for both angular and parallel misalignment, have had a tendency to bind or have had a tendency to wear excessively, or both and have been so constructed as to be incapable of efficiently absorbing a thrust load. The coupling in accordance with the present invention compensates for both angular and parallel misalignment of the coupled shafts and is efficient in transmitting both torque and thrust forces. The new coupling is designed to make binding virtually impossible and to keep wear at a minimum. This is partly accomplished by the fact that there is always a lubricated surface contact between moving parts of the coupling. Further, resilient means are located between two thrust pads of the coupling to minimize axially-directed vibration or shock from one shaft to the other. The resilient arrangement also broadens the tolerances required for parts of the coupling and thereby decreases the manufacturing cost.

It is, therefore, a principal object of the invention to provide an improved misalignment coupling of the type described which is more efficient, less subject to binding, and less subject to wear.

Another object of the invention is to provide a misalignment coupling having resilient means transmitting thrust from either shaft to the coupling sleeve.

Other objects and advantages of the invention will be apparent from the following detailed description of a preferred embodiment thereof, reference being made to the accompanying drawing, in which:

FIG. 1 is a view in longitudinal cross section of a coupling according to the invention with parallel but misaligned drive and driven shafts;

FIG. 2 is a fragmentary view of components shown in FIG. 1 with portions thereof in elevation;

FIG. 3 is a fragmentary view in transverse cross section taken along the line 3—3 of FIG. 2;

FIG. 4 is a view in perspective of a thrust pad of the coupling; and

FIG. 5 is a view in perspective of a thrust insert for the coupling.

Referring to the drawing, and particularly FIG. 1, a misalignment coupling according to the invention is indicated generally at 10 and connects related shafts 12 and 14, either of which can be the drive shaft. In this instance, the shafts 12 and 14 are shown as parallel, but misaligned or offset but the coupling will also be useful if the shafts 12 and 14 are angularly misaligned. The coupling 10 includes three principal components, hubs 16 and 18 and an outer coupling member 20.

The hubs 16 and 18 are identical in this instance and only one will be described in detail. The hub includes a collar 22 which is suitably affixed to one of the shafts by means of a key and keyway combination 24 and setscrews 26, for example. A hub body 28 is integral with the collar and has a spherical outer surface 30, at least at the rear area thereof adjacent the collar. The body 28 also has radially extending coupling and force transmitting teeth 32. In the preferred form, both the crowns and flanks of the teeth 32 are spherically curved and cooperate with internal spline teeth on the coupling member. Thus, the teeth 32 can rock relative to the coupling member 20 when the coupling rotates in a misaligned condition. The curvature of the teeth both at the crown and at the flank surfaces increases the misalignment capacity of the coupling by preventing binding and also reduces the high stresses on the ends of the teeth, which would otherwise occur if the surfaces were flat or straight.

Each of the hubs is provided with a recess 34 into which an insert 36 is driven or otherwise affixed. The insert 36 has a spherical projecting surface 38 directed toward the opposite hub and which provides means for transmitting thrust from one shaft through the opposite hub to the other shaft. The centers of curvature for the spherical hub surface 30, the crown portions of the teeth 32, and the projecting thrust surface 38 all lie at a common point on the axis of the hub. This is important to prevent binding of the hubs with the outer coupling member 20 or other components as the hubs oscillate or rock relative thereto during rotation of misaligned shafts. The radius of the projection 38 is less than that of the surface 30 which is less than that of the crown portions of the teeth 32. By using a shorter radius of curvature for the projection 38, the overall length of the coupling can be decreased over a coupling having a projection radius equal to that of the surface 30, for example.

The outer coupling member 20 includes a sleeve portion 40, on the inner surface of which are formed inwardly extending coupling teeth 42 which are preferably straight spline teeth parallel to the axis of the sleeve. At the ends of the sleeve 40, beyond the teeth 42, are end bearing rings or thrust pads 44 which are connected together through the sleeve 40 by suitable means, such as through bolts 46 and nuts 48. Inner surface portions 49 of the rings 44 preferably are spherical and cooperate with the spherically formed surfaces 30 of the hubs to provide thrust bearing surfaces preventing movement of the shafts 12 and 14 away from one another. While the surfaces 49 could be conical, the spherical configuration of them provides a better seal with the rear portions of the hubs for retaining lubricant in the coupling member.

To transmit an axial crowding thrust tending to move the shafts together, two thrust plates or pads 50 are located between the spherical projections 38 of the inserts 36 and have central spherical recesses 52 cooperating with the spherical projections 38 to provide an extensive bearing surface engagement therebetween. The centers of curvature for the recesses 52 preferably are the same as the centers of curvature for the corresponding projections 38. The diameter of thrust plates 50 being less than the internal diameter of sleeve 40, the plates are free to rotate relative to the sleeve. In a preferred form, the plates 50 have slippery surfaces and can be made of Teflon or Delrin, for example. While the thrust plates 50 could constitute but a single plate, the two plates are preferred when they are separated by resilient means. As shown, the resilient means constitute two Belleville springs 54 located in opposite or back-to-back relationship, being centered in shallow recesses 56 of the plates 50. By spacing the plates 50 apart by the resilient means 54, any sudden axial movement or longitudinal vibration of either of the shafts 12 and 14 will be partially absorbed instead of being transmitted directly to the other shaft. Further, by using the resilient means, the tolerance of various components can be broadened since the spacing between the surfaces 49 of the thrust rings 44 is less critical, as is the spacing between the hub surfaces 30. Hence, certain tolerances of many of the components can be increased or broadened and a satisfactory coupling still will be obtained. When the components of the coupling are assembled, a compressive force of 175 pounds is placed on the hubs so that the resilient means are placed under compression and an effective seal is obtained between the rings 44 and the hubs 16 and 18.

The operation of the coupling 10 will be apparent from the above description but will be briefly summarized. Torque from the driving shaft will be transmitted through the collar 22, the hub body 28, and the teeth 32 to the teeth 42 and the sleeve 40, and to the teeth, hub and collar for the opposite shaft. If the axes of the shafts 12 and 14 are misaligned, the torque is applied through the teeth at points removed from the centers thereof since the teeth 32 on the hubs 28 will rock with respect to each other and with respect to the sleeve 40 as the two shafts rotate. The rocking action is readily accommodated by the curvature of the crown and flank portions of the tub teeth 32.

If a thrust load occurs which would tend to separate the shafts, this thrust is taken up by the hub surfaces 30 in cooperation with the spherical surfaces 46 of the bearing rings 44. On the other hand, if a thrust load occurs tending to move the shafts together, this will be transmitted through the spherical projections 38, the thrust plates 50, and the springs 54.

Various modifications of the above described embodiment of the invention will be apparent and it is to be understood that such modifications can be made without departing from the scope of the invention, if they are within the the spirit and the tenor of the accompanying claims.

I claim:

1. A misalignment coupling for connecting a driving and a driven shaft for transmission of torque and thrust from the driving shaft to the driven shaft, said coupling comprising a hub connected to each of said shafts, each of said hubs having a series of teeth projecting radially outwardly, said teeth having spherically-contoured crown portions and spherically-contoured flanks to accommodate rocking movement of the coupling, each hub having a spherical surface on at least a portion between the teeth and the shaft, each of said hubs also having a spherical projection extending beyond the teeth toward the other hub, the center of curvature of said projection being the same as the centers of curvature of said spherical portion of said hub and said crown portions of said teeth, an outer coupling member surrounding said hubs and including a sleeve having internal teeth in mesh with the teeth of said hubs, said internal teeth having straight crowns and flanks, a thrust pad at each end of said sleeve, each having an inwardly directed spherical surface mating with the spherical surface of the corresponding hub, two plastic thrust pads between said spherical projections of said hubs, said pads being free to rotate relative to said sleeve and to move axially relative to said sleeve, said pads having spherical recesses mating with said spherical projections of said hubs, and a pair of opposed Belleville springs centrally located between said pads and under compression in contact with said pads.

2. A misalignment coupling for connecting a drive shaft and a driven shaft for transmission of torque and thrust from the drive shaft to the driven shaft, said coupling comprising a hub connected to each of said shafts, each of said hubs having a series of teeth projecting radially outwardly, said teeth having spherically-contoured crown portions and spherically-contoured flanks to accommodate rocking movement of the coupling, each hub having a spherical surface on at least a portion between the teeth and the shaft, each of said hubs also having a spherical projection extending beyond the teeth toward the other hub, the center of curvature of said projection being the same as the centers of curvature of said spherical portion of said hub and said crown portions of said teeth, an outer coupling member surrounding said hubs and including a sleeve having internal teeth in mesh with the teeth of said hubs, said internal teeth having straight crowns, a thrust pad at each end of said sleeve, each having an inwardly directed surface toward the spherical surface of the corresponding hub, two thrust pads between said spherical projections of said hubs, said pads being free to rotate relative to said sleeve and to move axially relative to said sleeve, said pads having spherical recesses mating with said spherical projections of said hubs, a spring centrally located between and in contact with said pads.

3. A coupling according to claim 2 characterized by the radius of said spherical projections being less than the radius of said spherical surfaces of said hubs.

4. A misalignment coupling for connecting a drive and a driven shaft for transmission of torque and thrust from the drive shaft to the driven shaft, said coupling comprising a hub connected to each of said shafts, each of said hubs having a series of teeth projecting radially outwardly, said teeth having spherically-contoured crown portions and spherically-contoured flanks to accommodate rocking movement of the coupling, each of said hubs also having a projection extending beyond the teeth toward the other hub, an outer coupling member surrounding said hubs and including a sleeve having internal teeth in mesh with the teeth of said hubs, said internal teeth having straight crowns, a thrust pad at each end of said sleeve, each having an inwardly directed surface engageable with the corresponding hub, two thrust pads between said projections of said hubs, said pads being free to move axially relative to said sleeve, said pads having recesses aligned with said projections of said hubs, resilient means located between and in contact with said pads.

5. A misalignment coupling for connecting a drive and a driven shaft for transmission of torque and thrust from the drive shaft to the driven shaft, said coupling comprising a hub connected to each of said shafts, each of said hubs having a series of engaging teeth projecting radially outwardly, each of said hubs having a spherical projection extending beyond the teeth toward the other hub, an outer coupling member surrounding said hubs and including a sleeve having internal teeth in mesh with the teeth of said hubs, a thrust pad at each end of said sleeve and having an inwardly directed surface engageable with the corresponding hub, two thrust pads between said spherical projections of said hubs, said pads being free to move axially relative to said sleeve, said pads having spherical recesses mating with said spherical projections of said hubs, and springs centrally located between and in contact with said pads.

6. A misalignment coupling for connecting a drive and a driven shaft for transmission of torque and thrust from the drive shaft to the driven shaft, said coupling comprising a hub connected to each of said shafts, each of said hubs having a series of teeth projecting radially outwardly, said teeth having spherically-contoured crown portions and spherically-contoured flanks to accommodate rocking movement of the coupling, each hub having a spherical surface on at least a portion between the teeth and the shaft, each of said hubs also having a spherical projection extending beyond the teeth toward the other hub, the center of curvature of said projection being the same as the centers of curvature of said spherical portion of said hub and said crown portions of said teeth, an outer coupling member surrounding said hubs and including a sleeve having internal teeth in mesh with the teeth of said hubs, said internal teeth having straight crowns, a thrust pad at each end of said sleeve, each having an inwardly directed spherical surface engageable with the spherical surface of the corresponding hub, thrust pad means between said spherical portions of said hubs, said pad means being free to rotate relative to said sleeve and to move axially relative to said sleeve, said pad means having spherical surfaces mating with said spherical projections of said hubs.

7. A misalignment coupling for connecting a drive and a driven shaft for transmission of torque and thrust from the drive shaft to the driven shaft, said coupling comprising a hub connected to each of said shafts, each of said hubs having a series of teeth projecting radially outwardly, said teeth having spherically-contoured crown portions and spherically-contoured flanks to accommodate rocking movement of the coupling, each hub having a spherical surface on at least a portion between the teeth and the shaft, each of said hubs also having a projection extending beyond the teeth toward the other hub, an outer coupling member surrounding said hubs and including a sleeve having internal teeth in mesh with the teeth of said hubs, said internal teeth having straight crowns, a thrust pad at each end of said sleeve, each having an inwardly directed surface engageable with the spherical surface of the corresponding hub, thrust pad means between said projections of said hubs, said thrust pad means being free to move axially relative to said sleeve, said thrust pad means having spherical recesses aligned with said projections of said hubs, with the centers of curvature of said recesses being the same as the centers of curvature of said spherical portions of said hubs and said crown portions of said teeth.

8. A misalignment coupling for connecting a drive and a driven shaft for transmission of torque and thrust from the drive shaft to the driven shaft, said coupling comprising a hub connected to each of said shafts, each of said hubs having a series of teeth projecting radially outwardly, said teeth having spherically-contoured crown portions and spherically-contoured flanks to accommodate rocking movement of the coupling, each of said hubs also having a spherical projection extending beyond the teeth toward the other hub, an outer coupling member surrounding said hubs and including a sleeve having internal teeth in mesh with the teeth of said hubs, said internal teeth having straight crowns, and thrust pad means between said projections of said hubs, said thrust pad means being free to move axially relative to said sleeve, said thrust pad means having recesses aligned with said projections of said hubs.

References Cited by the Examiner
UNITED STATES PATENTS

| | | | |
|---|---|---|---|
| 1,306,653 | 6/1919 | Wingfield | 64—9 X |
| 1,770,744 | 7/1930 | Morgan | 64—9 |
| 1,860,762 | 5/1932 | Wyrick | 64—8 |
| 2,496,702 | 2/1950 | Dykman et al. | 64—9 |
| 3,091,102 | 5/1963 | Linderme | 64—8 |
| 3,142,972 | 8/1964 | Spaulding | 64—7 |

FRED C. MATTERN, JR., *Primary Examiner.*

HALL C. COE, *Examiner.*